(12) United States Patent
Quijano et al.

(10) Patent No.: US 9,255,661 B2
(45) Date of Patent: Feb. 9, 2016

(54) ADJUSTERS TO CONTROL LOWER JOINTS AND UPPER JOINTS

(71) Applicant: Hewlett-Packard Development Company, L.P., Houston, TX (US)

(72) Inventors: David Quijano, Fort Collins, CO (US); George Janour, Santa Cruz, CA (US); Ken Robertson, San Jose, CA (US); Bruce Eisenhauer, DuQuoin, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 245 days.

(21) Appl. No.: 13/907,788

(22) Filed: May 31, 2013

(65) Prior Publication Data

US 2014/0353453 A1     Dec. 4, 2014

(51) Int. Cl.
| | |
|---|---|
| *A47F 5/00* | (2006.01) |
| *F16M 11/18* | (2006.01) |
| *F16M 11/04* | (2006.01) |
| *F16M 11/10* | (2006.01) |
| *F16M 11/20* | (2006.01) |

(52) U.S. Cl.
CPC ............ *F16M 11/18* (2013.01); *F16M 11/046* (2013.01); *F16M 11/10* (2013.01); *F16M 11/2021* (2013.01); *F16M 2200/024* (2013.01); *F16M 2200/041* (2013.01); *F16M 2200/044* (2013.01); *F16M 2200/08* (2013.01)

(58) Field of Classification Search
CPC ..... F16M 11/18; F16M 11/046; F16M 11/10; F16M 11/2021; F16M 11/04; F16M 220/047; F16M 220/044

USPC .................. 248/122.1, 121, 133; 361/679.27
See application file for complete search history.

(56) References Cited

U.S. PATENT DOCUMENTS

| | | | |
|---|---|---|---|
| 7,091,961 B2 | 8/2006 | Ditzik | |
| 7,431,254 B2 | 10/2008 | Cheng | |
| 7,497,410 B2 | 3/2009 | Lee | |
| 7,694,919 B2 | 4/2010 | Lee | |
| 7,694,929 B2 * | 4/2010 | Jang ....................... | F16M 11/04 248/372.1 |
| 7,967,260 B2 * | 6/2011 | Hsu ........................ | F16M 11/04 248/133 |
| 8,033,513 B2 | 10/2011 | Jang et al. | |
| 8,763,969 B2 * | 7/2014 | Wu ......................... | F16M 11/10 248/123.11 |
| 8,944,396 B2 * | 2/2015 | Mau ........................ | E05D 3/12 248/274.1 |
| 8,967,569 B2 * | 3/2015 | Hsu ........................ | F16M 11/10 16/233 |
| 2005/0002159 A1 * | 1/2005 | Jeong ...................... | F16M 11/04 361/679.27 |
| 2007/0194183 A1 * | 8/2007 | Kim ........................ | F16M 11/04 248/125.9 |
| 2014/0192504 A1 * | 7/2014 | Richard ................ | F16M 11/10 361/807 |

FOREIGN PATENT DOCUMENTS

WO     WO-2012/125912 A2     9/2012

* cited by examiner

*Primary Examiner* — Anita M King
(74) *Attorney, Agent, or Firm* — HP Legal Department

(57) ABSTRACT

An adjuster is to control operation of a lower joint and an upper joint. The lower joint couples a base to an arm, and the upper joint couples the arm to a mount. The adjuster controls the joints according to a first mode and a second mode. The first mode is to secure the lower and upper joints against adjustability. The second mode is to release the lower and upper joints for adjustability.

12 Claims, 9 Drawing Sheets

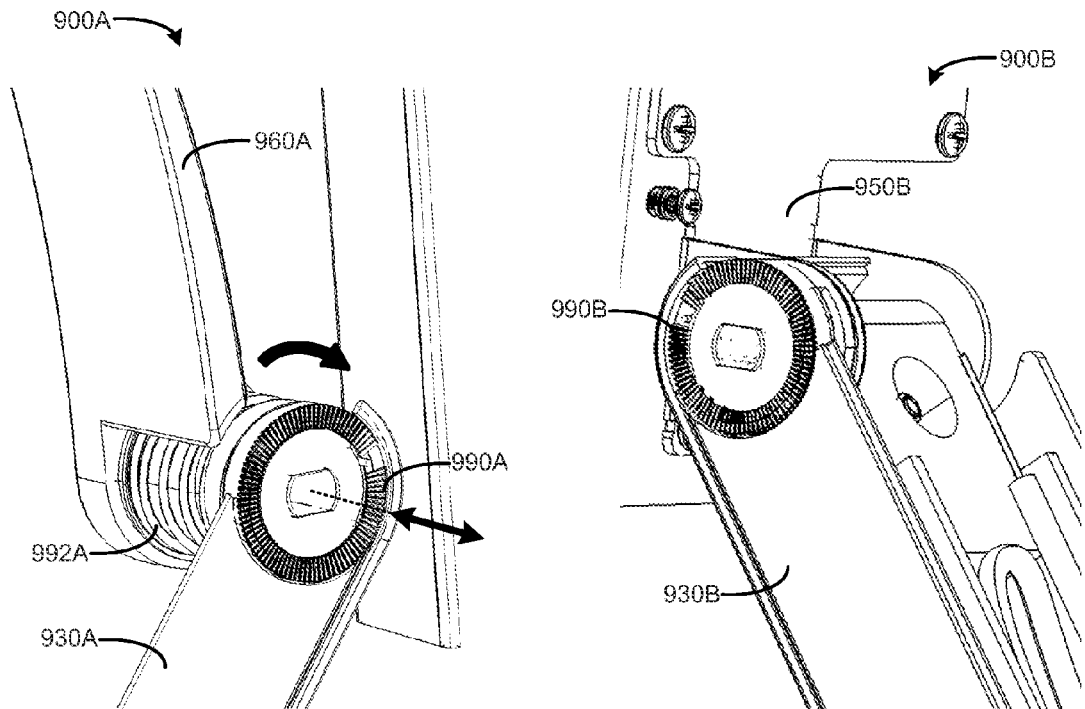
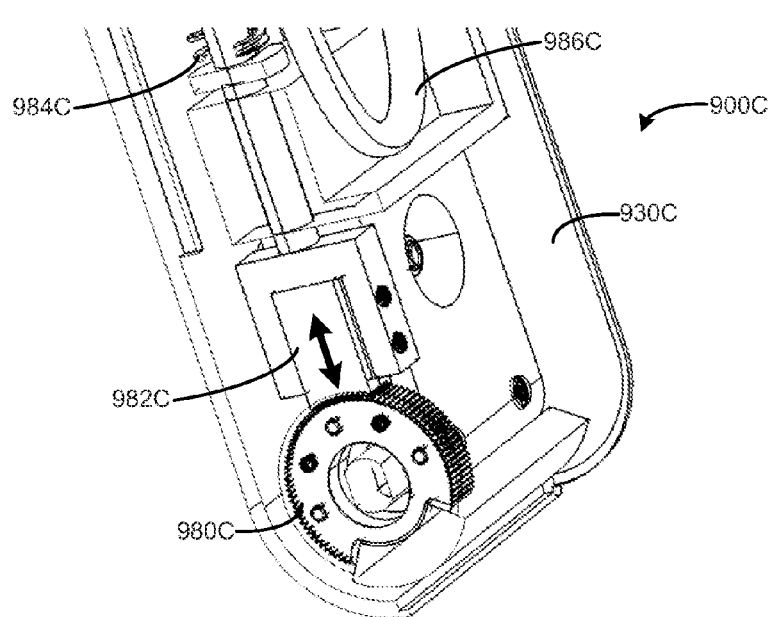

ADJUSTERS TO CONTROL LOWER JOINTS AND UPPER JOINTS

BACKGROUND

A computing display may be supported by a display mount, such as a locking support arm. A display support arm may have a locking knob that turns a screw to tighten an arm joint and hold the joint in place. Thus, adjusting the display for use typically needs difficult steps to be performed.

BRIEF DESCRIPTION OF THE DRAWINGS/FIGURES

FIG. 9A is a perspective cut-away view of an apparatus including a mechanism according to an example.

FIG. 9B is a perspective cut-away view of an apparatus including a mechanism according to an example.

FIG. 9C is a perspective cut-away view of an apparatus including a mechanism according to an example.

DETAILED DESCRIPTION

Displays for computing devices, including those that use a stylus as an input device, may be adjustable to accommodate multiple usage positions and to provide various benefits such as optimal ergonomics, ease of use, changing between different positions, and so on. For example, multiple separate adjusters may be adjusted and locked at a desired height and angle for the display. Adjusting a display may involve going behind the display to turn a locking knob, and then sitting down before the display to see if the display is in a usable position. If not satisfactorily positioned, the procedure may need to be repeated by going back behind the display, loosening the knob, adjusting the display, and then retightening the knob. Furthermore, the adjustability may be limited, preventing the use of some desired positions.

Examples provided herein illustrate various stands/supports and/or supported displays that maximize flexibility of adjustment, while providing positions that are lockable so that the display stays in a desired position. Pen-input displays may particularly benefit from the display being easily adjustable, along with having a locking functionality that is easily accessible and easy to manipulate. Example stands may include a locking mechanism that is easy to use and access, to enable adjustability and locking of the display support. For example, a display height and angle may be lockable, using a single adjuster to control adjustability of joints for both height and display angle. It is not needed to perform multiple adjustments to get the display to the correct position, because it is possible to adjust and then immediately lock the adjusted angle and/or height, at any position. Such adjustments may be performed from a normally seated position before the display, without having to get up and move behind the display.

Figure 1:
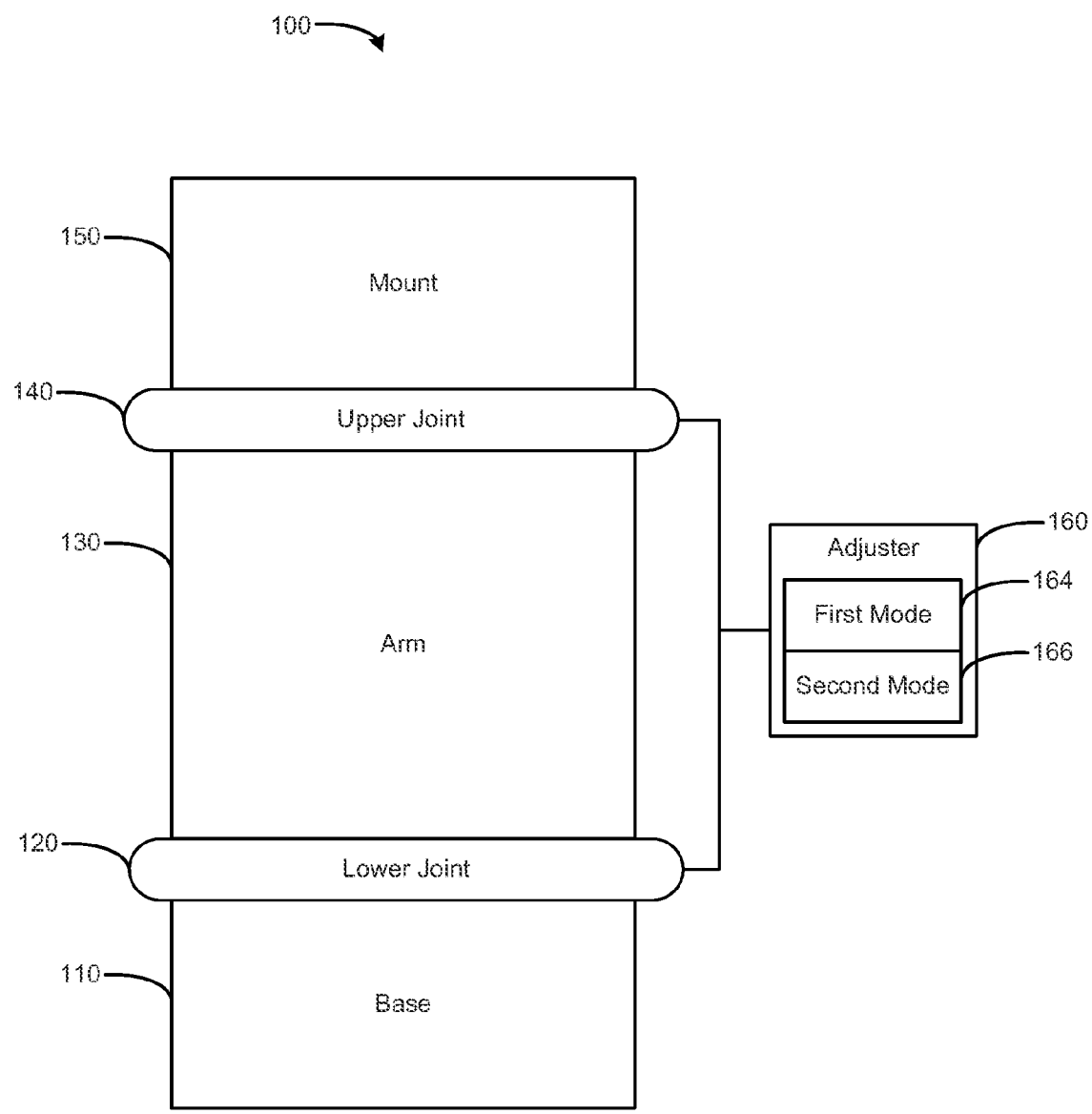
FIG. 1 is a block diagram of an apparatus including an adjuster according to an example.

FIG. 1 is a block diagram of an apparatus 100 including an adjuster 160 according to an example. The apparatus 100 includes a base 110 coupled to arm 130 via lower joint 120. The arm 130 is coupled to mount 150 via upper joint 140. The apparatus 100 is adjustable based on the adjuster 160, which includes a first mode 164 and a second mode 166.

In an example, the mount 150 is to receive a display. Thus, the mount 150 may include a standard interface to mount a display, such as a Video Electronics Standards Association (VESA) Mounting Interface Standard (MIS), i.e., a VESA mount, Flat Display Mounting Interface (FDMI), or other mount. Mount 150 may be compatible with mounting other devices that include displays, such as laptop/notebook computers, tablet computers having a display, non-display tablet input devices, smartphones, portable media players, portable gaming devices, and so on. In an example, the mount 150 may include an adjustable grip to securely mount a display and/or device to the mount 150, even if the display/device to be mounted does not include standard VESA mounting screw holes.

The adjuster 160 is operable in different modes. For example the adjuster 160 may be a knob rotatable between different positions, a toggle slidable between positions, a lever movable to different positions, an electronic switch, and so on to support the selective use of the first mode 164 and the second mode 166. The first mode 164 may be a default, locked setting where the lower joint 120 and the upper joint 140 are secured against adjustability. In an example, the adjuster 160 is biased toward the first mode 164 by a spring or other bias mechanism. Thus, for typical day-to-day usage, the adjuster 160 may remain in the first mode 164 to hold the positioning of the apparatus 100. The second mode 166 may be a setting that enables adjustability of both the lower joint 120 and the upper joint 140. For example, the second mode 166 may enable free movement of the mount 150 by virtue of unlocked lower and upper joints 120, 140, including free adjustability of both an angle and a height of the mount 150 relative to the arm 130 and/or base 110. Thus, when an adjustment is desired, the adjuster 160 may be used to actuate the second mode 166 to enable repositioning of the apparatus 100. When the desired positioning is achieved, the adjuster 160 may be set to the first mode 164 (e.g., releasing the adjuster 160 to allow the adjuster 160 to spring back into a default first mode 164). In alternate examples, the adjuster 160 may not include a default mode, e.g., the various modes are selectable without bias toward a specific mode. In an alternate example, the adjuster 160 may include a plurality of modes (e.g., more than two modes), including modes to control at least one one joint(s) and/or mechanism(s) separately from at least another joint(s)/mechanism(s).

The adjuster 160 is shown operatively coupled to both the upper joint 140 and the lower joint 120, to enable control over both the lower and upper joints 120, 140. The coupling between the adjuster 160 and joints includes the ability to accommodate variations in service length between the adjuster and the upper joint 140 and/or the lower joint 120 throughout a range of motion of the arm and lower and upper joints 120, 140. Thus, the adjuster 160 may be located remotely from one or both of the upper and/or lower joints 120, 140. Locating the adjuster 160 remotely from a corresponding joint enables freedom of design, without needing a complex linkage/armature to accommodate any differences in length to the adjuster 160 as the apparatus 100 is manipulated. In an example, the adjuster 160 may be provided on the base 110, the lower joint 120, the arm 130, the upper joint 140, the mount 150, or other locations. In an alternate example, the adjuster 160 may be provided as a remote housing, physically separated from and coupled to the apparatus 100 via cabling. In an alternate example, the adjuster 160 may be provided coaxially with at least one of the upper joint 140 and/or the lower joint 120.

Lower joint 120 and/or upper joint 140 may be various types of joints, including hinges, ball joints, universal joints, and others. Examples of apparatus 100 may include a display stand having a dual-hinge configuration where the lower joint 120 is a hinge to adjust a height of the mount 150 relative to the base 110, and the upper joint 140 is a hinge to adjust an angle of the mount 150 relative to the base 110 and/or arm 130. The lower and upper joints 120, 140 may be adjusted independently of each other.

The arm 130 may be a rigid member, and in alternate examples may be a flexible member (e.g., a multi-segmented articulated arm). The arm 130 may include a four-bar linkage between the lower joint 120 and upper joint 140, to control the independent range of motions of the lower and upper joints 120, 140 throughout a movement range of the apparatus 100. In an example, such a four-bar linkage may limit a range of motion of the upper joint 140 when the lower joint 120 is folded over, and enable the upper joint 140 to have an unlimited range of motion when the lower joint 120 is unfolded. Thus, the four-bar enables the rotation of one joint to drive rotation of the other joint, and/or restrict its motion. The four-bar can change the range of motion limits for the joints, such as how far the arm 130 and/or mount 150 may be angled back. In an example, when the lower joint 120 is at a vertical orientation of 90 degrees, a four-bar linkage may enable the upper joint 140 to be angled back up to 30 degrees maximum. However, as the lower joint 120 is lowered toward a horizontal orientation (e.g., toward zero degrees), the four-bar linkage enables an increasing range of motion of the upper joint 140 by dynamically changing the stop of the upper joint 140. The reverse situation is also true, where the range of motion of the lower joint 120 may be affected by the position/rotation of the upper joint 140. Thus, for example, when the lower joint 120 is at a 90 degrees (vertical) position, the four-bar linkage may limit the upper joint 140 to a −30 degrees stop and a +10 degrees stop. When the lower joint is at 0 degrees (horizontal), the four-bar linkage may allow an increased range of motion for the upper joint 140 of a −10 degrees stop and a −90 degrees stop. Such relationships and limits are fully adjustable in various examples, depending on a desired setup for the four-bar linkage. In an example, the mount 150 may be intended to mount a non-touch visual kiosk display, having a four-bar linkage to impose a stricter limit on the range of motion of the upper joint 140 to ensure that the display remains relatively upright to maximize viewability by an audience throughout a range of motion of the display. In an alternate example, the mount 150 may be intended to mount a touch-based tablet display, whereby the four-bar linkage may be chosen to include a range of motion for the upper joint 140 to encourage horizontal positions of the tablet mounted to the apparatus 100.

The base 110 may be suitable for various applications. For example, the base 110 may be relatively wider than the arm 130 and/or mount 150 for stability when standing the base 110 on a supporting structure such as a desktop, and the base 110 may include weights for increased stability and increasing a range of motion and weight that may be mounted while avoiding instability. The base 110 also may be mechanically coupled to a desktop, tabletop, or other structure, such as by clamping to an edge of a desktop or mounting to the surface of the desk. The base 110 also may be wall-mounted, e.g., using lag bolts that penetrate into a wall to secure the base 110 to a wall. Other types of mounting may be used as appropriate for enabling base 110 to support the apparatus 100 and the device (e.g., display) to be mounted to the mount 150.

Figure 2:
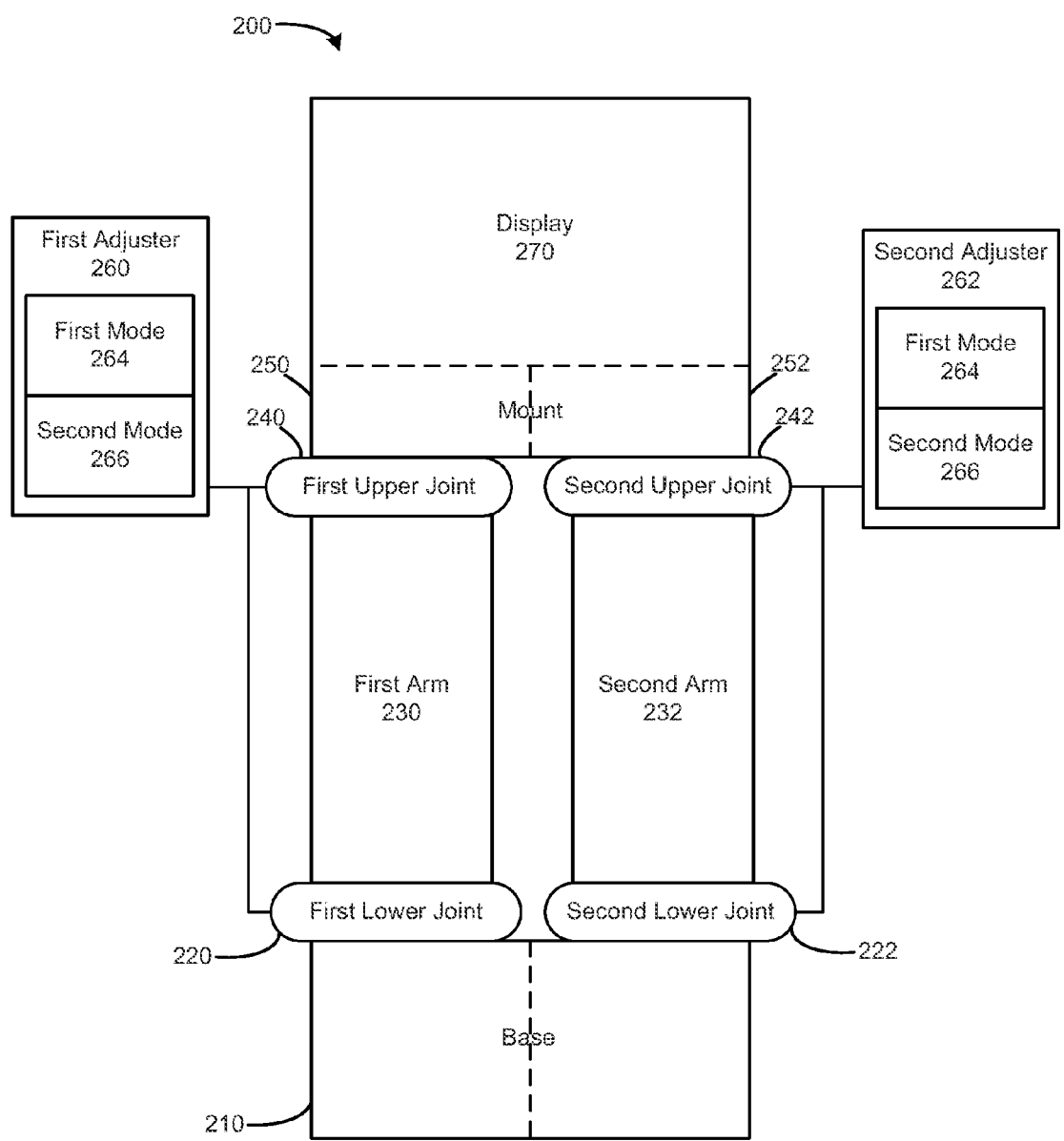
FIG. 2 is a block diagram of an apparatus including a first adjuster and second adjuster according to an example.

FIG. 2 is a block diagram of an apparatus 200 including a first adjuster 260 and second adjuster 262 according to an example. The apparatus 200 also includes base 210, coupled to first arm 230 and second arm 232 via first lower joint 220 and second lower joint 222. The first and second arms 230, 232 are coupled to first and second mounts 250, 252 via the first upper joint 240 and the second upper joint 242. The first and second mounts 250, 252 are coupled to a display 270. The first upper and lower joints 220, 240 are coupled to a first adjuster 260, and the second upper and lower joints 222, 242 are coupled to a second adjuster 262. The first and second adjusters 260, 262 are associated with first and second modes 264, 266, to secure or release the joints for adjustability.

The first and second adjusters 260, 262 are shown located at the first and second upper joints 240, 242. In an example, the first and second adjusters 260, 262 are paddles/levers that pivot about an axis shared by the first and second upper joints 240, 242. The first and second adjusters 260, 262 may be used to release locking mechanisms, by moving the adjusters from the first mode 264 to actuate the second mode 266. Thus, when the first and second adjusters 260, 262 are engaged, a clutch may be released in the first and second upper joints 240, 242 that are near the adjusters. In contrast, a cable may be tensioned to release a brake mechanism in the first and second lower joints 220, 222 that are remote from the adjusters. While the adjusters are engaged in the second mode 266, the apparatus 200 may be adjusted and manipulated as needed to position the display 270 into a desired position. When the desired position is obtained, the paddles may be released to lock the display 270 in that position. The first and second adjusters 260 may be operable while a user is in a typical usage position in front of the display 270, avoiding a need for the user to move behind the display 270 for adjustments, enabling the user to see and experience the effects of moving the apparatus 200 while it is being moved around and adjusted, from the perspective of a normal usage user position.

The apparatus 200 may support additional modes and/or actuations based on at least one of the first and second adjusters 260, 262. In an example, a lever-style adjuster may be rotatable through a range of multiple modes (e.g., more than two). In an example, a first mode may lock all joints, a second mode may unlock the first and second upper joints 240, 242 for tilting the display, and a third mode may unlock all joints to enable both tilting of the display via the upper joints, and raising and lowering the arms 230, 232 based on unlocking the first and second lower joints 220, 222.

The modes may be actuated based on one or both adjusters 260, 262. For example, apparatus 200 may remain locked unless both the first and second adjusters 260, 262 are actuated simultaneously. In an alternate example, an adjuster may be omitted such that both arms 230, 232 of apparatus 200 may be unlockable based on actuation of a single adjuster. Locking the apparatus 200 unless both adjusters 260, 262 are actuated may provide a safety feature, e.g., for heavy displays that pose a crushing risk to users, by preventing accidental activation if one adjuster is accidentally bumped. Additionally, this dual-adjuster feature may encourage more stability during adjustment, by encouraging a user to grasp the display 270 with two hands (one hand on each side of the display 270) to actuate the first and second adjusters 260, 262.

The first and second upper and lower joints 220, 222, 240, 242 may include an audio feedback feature. For example, the joints may produce a pleasing ratcheting sound when adjusted in accordance with the proper use of the first and second adjusters 260, 262. The joints also may produce a relatively louder, even jarring clicking/clacking sound, e.g., if the apparatus 200 is adjusted without properly engaging the adjusters. In an example, the joints may enable adjustability when locked, if they are forced (e.g., if exceeding a yield threshold associated with preventing adjustability). Forcing the joints may generate the loud noise (clacking) to inform the user that the action is not encouraged. When the yield threshold is exceeded, the joints may enable a limited freedom of adjustability, such as allowing slowed and limited movements, in contrast to the free movement enjoyed during proper use of the adjusters. The level of audio feedback, and establishing at what force levels the joints will yield (i.e., choosing a yield threshold force) may be a function of multiple variables. For example, a joint may use a gear or clutch having teeth that interact with another gear or other engaging member, such that an angle of the teeth affects the yield threshold and sound that is generated when the yield threshold is exceeded (e.g., causing the teeth to fractionally slip past an engaging member). Other factors affecting the yield threshold include an amount of spring force biasing the teeth against each other and/or an engaging member, an angle of the engaging member (e.g., a pall engagement surface at the end of a plunger), an amount of biasing/spring force used in biasing the adjusters toward a particular mode, a biasing/spring force to bias the teeth and/or engaging members, and so on. In an alternate example, at least one of the first and second adjusters 260, 262 may be omitted, such that the joints are adjustable based on exceeding the yield threshold without a need to engage an adjuster (and which may or may not include the use of audio feedback). In an example, the first and second upper joints 240, 242 may be associated with a first type of audio feedback, and the first and second lower joints 220, 222 may be associated with a second type of audio feedback. Differing types of audio feedback enable a user to receive more detailed information based on the feedback, including additional and/or increasing degrees of audio disincentives to discourage exceeding the various yield thresholds that may be associated with different joints. The differing feedback may include positive audio feedback to encourage proper usage. In an example, the upper joints may provide a lower yield threshold associated with a less audible audio feedback, and the lower joints may provide a higher yield threshold associated with a more audible audio feedback.

The first and second arms 230, 232 may provide passages for cables, linkages, and/or other components, including electrical cords/wires. Thus, the first and/or second arms may provide a clean aesthetic by concealing the typical power and signal cords associated with a display 270. In an example, the arm(s) may conceal a power cord, a video signal cord, and a universal serial bus (USB) cord that run from the display 270 down into the base 210, where they may be available to interface with a separate computing system or power source. In an alternate example, the display 270 includes a computing system (e.g., an "all-in-one" computer) such that a power cord is concealed in the arm(s) 230, 232. Throughout the FIGS., examples are illustrated to both include and omit various aesthetic body panels that may conceal underlying components.

Figure 3:
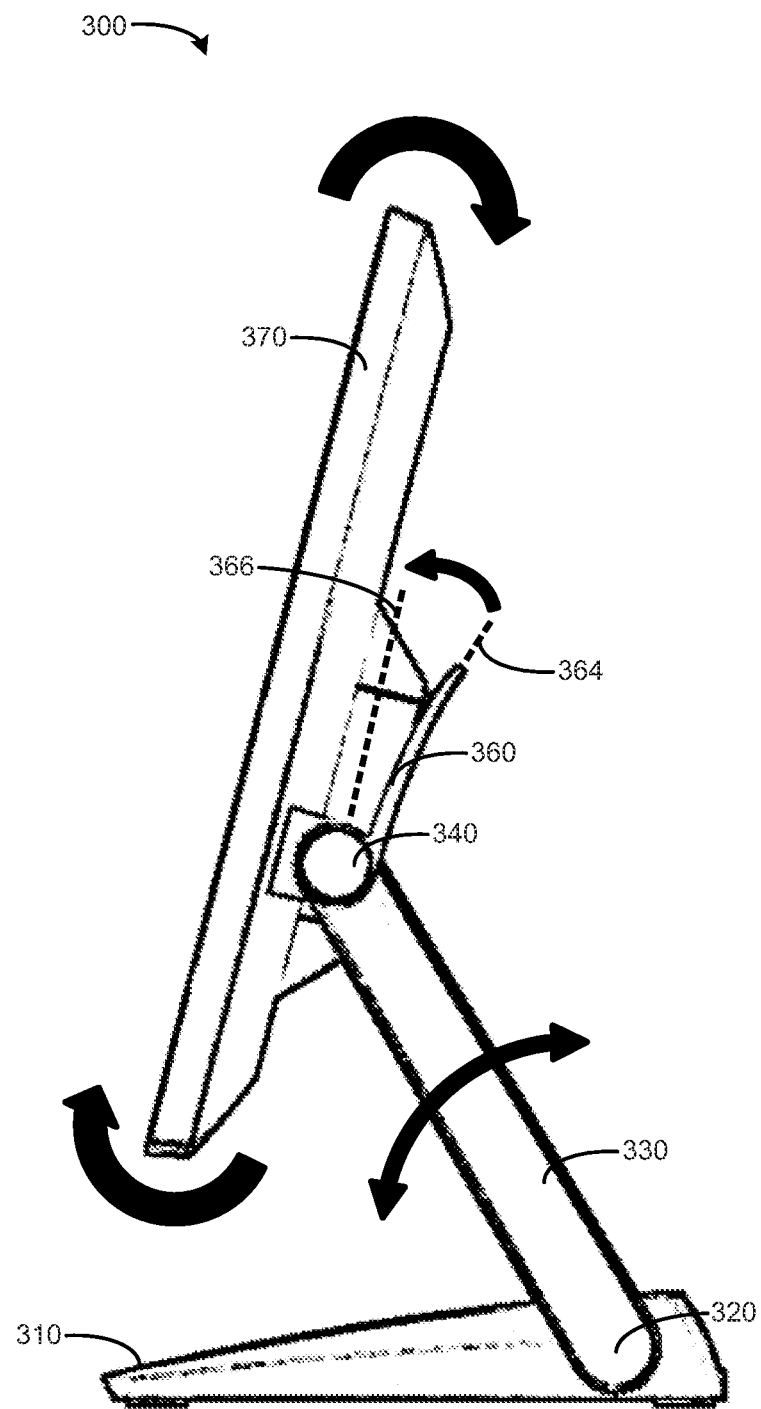
FIG. 3 is a diagram of an apparatus including an adjuster and display according to an example.

FIG. 3 is a diagram of an apparatus 300 including an adjuster 360 and display 370 according to an example. The apparatus 300 also includes base 310 coupled to arm 330 via lower joint 320. The arm 330 is coupled to the display 370 and adjuster 360 via the upper joint 340. The adjuster 360 may be actuated between positions associated with a first mode 364 and a second mode 366.

The display 370 is fully adjustable based on actuating the lever handle of the adjuster 360. Upon moving the adjuster 360 to actuate the second mode 366, characteristics of the display 370 may be adjusted including tilt angle and display height/position. The lever handle of the adjuster 360 is configured to extend away from the upper joint 340 substantially parallel to the display 370, and its lever arm is offset from a center of rotation of the upper joint 340/adjuster 360. Accordingly, a user's hand may grip an edge of the display 370 and selectively actuate the adjuster 360. Thus, in an example having two adjusters 360, a user may use both hands to grip both edges of the display 370 and actuate both adjusters 360 to freely move the display 370 to various positions.

It is desirable to be able to regularly adjust a pen-input display or other touch display 370 for various pen/hand input positions. For example, a digital artist needs a pen input display to be able to lock after adjustments, so the display does not move when the digital artist is drawing upon the display. The examples provided herein provide easy-to-use adjustability, enhancing a user experience for pen and/or touch input, including pen/touch-input all-in-one devices or other input devices (e.g., a touch-based, non-display tablet for art work).

The adjuster 360 of FIG. 3 is shown having a paddle/handle being slightly curved and angled away as it extends upward, for enhanced grippability and reach/throw throughout a range of motion of the adjuster 360. The handle(s) of the adjuster 360 may be relocated to other positions, including extending downward or outward, or extending both upward and downward in a butterfly configuration. The adjusters 360 may incorporate ergonomic features as well as aesthetic/industrial design features for an appealing appearance and to encourage good ergonomic interaction with a user's hand grip on the display 370. For example, the adjusters 360 may be positioned to encourage a user to grip the display 370 at its center of mass, as well as at a location corresponding to aligning a user's wrist joints to pivot the user's hands in concert with the pivoting of the display 370 about the upper joint 340. In an example, a distance of the handle of the adjuster 360 from a finger grip to the upper joint 340 corresponds to a length between a typical user's hand grip and wrist joint. Thus, the position, shape, and other characteristics of the upper joint 340 and adjuster 360 may be chosen to encourage a user's hands to be placed at a "sweet spot" for adjusting the display 370, including both for adjustability leverage and a natural gripping area to grasp and manipulate the display 370 about the upper joint 340 (e.g., the sweet spot may be near a center of mass and/or near the upper joint 340). Additionally, the adjusters 360 may be biased to include a pull force that is relatively low, e.g., to be operable with one finger without requiring a relatively great force (e.g., to overcome release mechanism spring(s)). In alternate examples (e.g., in a usage scenario where safety is valued more than ease of actuation), the pull force may be enhanced to prevent easy adjustability, e.g., in a scenario where a child may hang from or otherwise tamper with a display, or in an industrial setting where a user may be wearing bulky gloves, and so on).

Figure 4C:
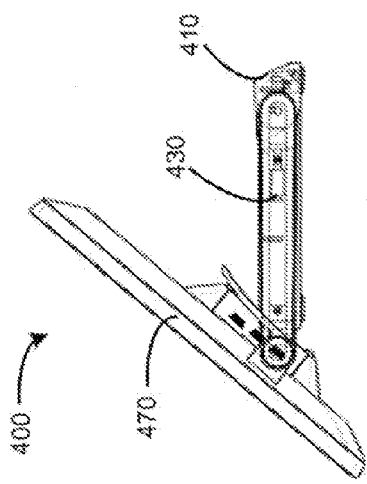
FIGS. 4A-4F are diagrams of an apparatus including a base, arm, and display in various positions according to an example.
Figure 4F:
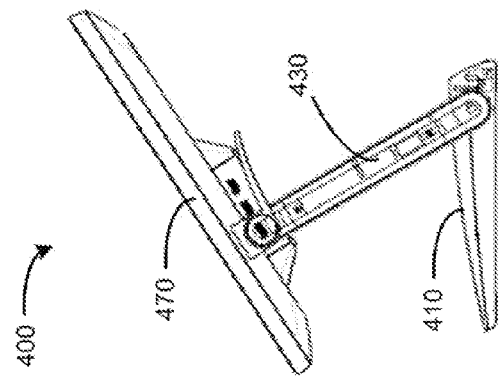
Figure 4B:
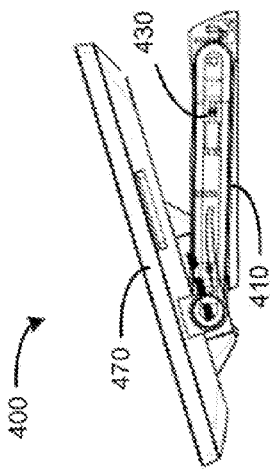
Figure 4E:
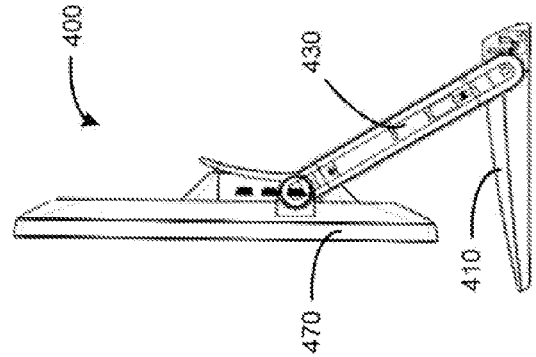
Figure 4A:
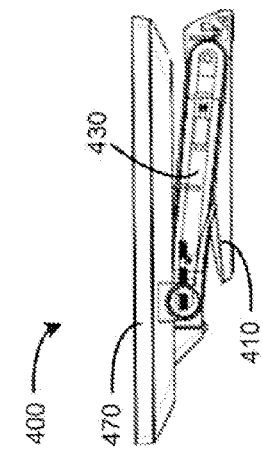
Figure 4D:
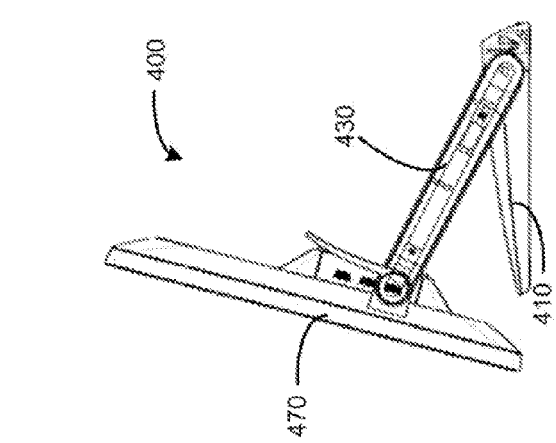

FIGS. 4A-4F are diagrams of an apparatus 400 including base 410, arm 430, and display 470 in various positions according to an example. The base 410 is weighted and broad enough to enable stability, without a need to include mounting hardware to specifically attach the base 410 to a table or other surface. FIG. 4A shows a horizontal configuration, whereby a surface of the display 470 is flat and positioned for easy pen or touch input, e.g., as a compact table-top computing experience. The back of the display 470 may include a pad (e.g., rubber bumper) that can contact the base 410, increasing stability of the position and protecting the display 470 and/or base 410 from scratching/wearing on each other. FIG. 4B shows a low-angle configuration, whereby the arm 430 is in a horizontal configuration and the display 470 is tilted for user interaction and displaying information, such that a portion of the back of the display 470 is allowed to contact the underlying support surface to provide additional stability. The back of the display 470 may include a pad or bump where contact with the underlying support surface is desired for additional stability. The back of the display 470 also may include a second pad/bump toward an upper area of the display 470, to also contact the base 410. Thus, the bumps may provide 2-point contact for additional stability and rigidity by allowing the base and underlying support surface to directly support the back of the display 470, enabling the display 470 to withstand excessive force/weight. In an example, the display 470 may endure a force that exceeds the yield threshold, while remaining stable and unaffected. FIG. 4C illustrates a medium angle for use over a support/desktop edge. Thus, a portion of the display 470 is allowed to hang down below the level of support provided to the base, enabling an easy pen/touch input position similar to an artist's easel, which also may enable the user to achieve a more intimate position relative to the display 470, including allowing the user to rest the lower edge of the display 470 on the user's lap and rest an arm over the top of the display, similar to a natural artistic interaction. FIG. 4D shows a low vertical, or hover, configuration. The display is nearly vertical and tilted back slightly, and the arms 430 are angled to position the display 470 low such that a lower edge of the display 470 is nearly touching the underlying support for base 410. FIG. 4E shows a high vertical configuration, similar to a typical flat screen display arrangement whereby the display 470 is vertical and the arms 430 are steeply angled to position the display 470 at a high position toward a front of the base 410, maximizing viewability while still remaining stable. FIG. 4F shows high-angle max tilt position, suitable for pen/touch input while elevating the display 470 upward and away from the underlying support surface. These are merely a selection of various positions enabled by the examples herein, and various other positions/configurations are possible due to the adjustability enabled by the adjusters.

Figure 5:
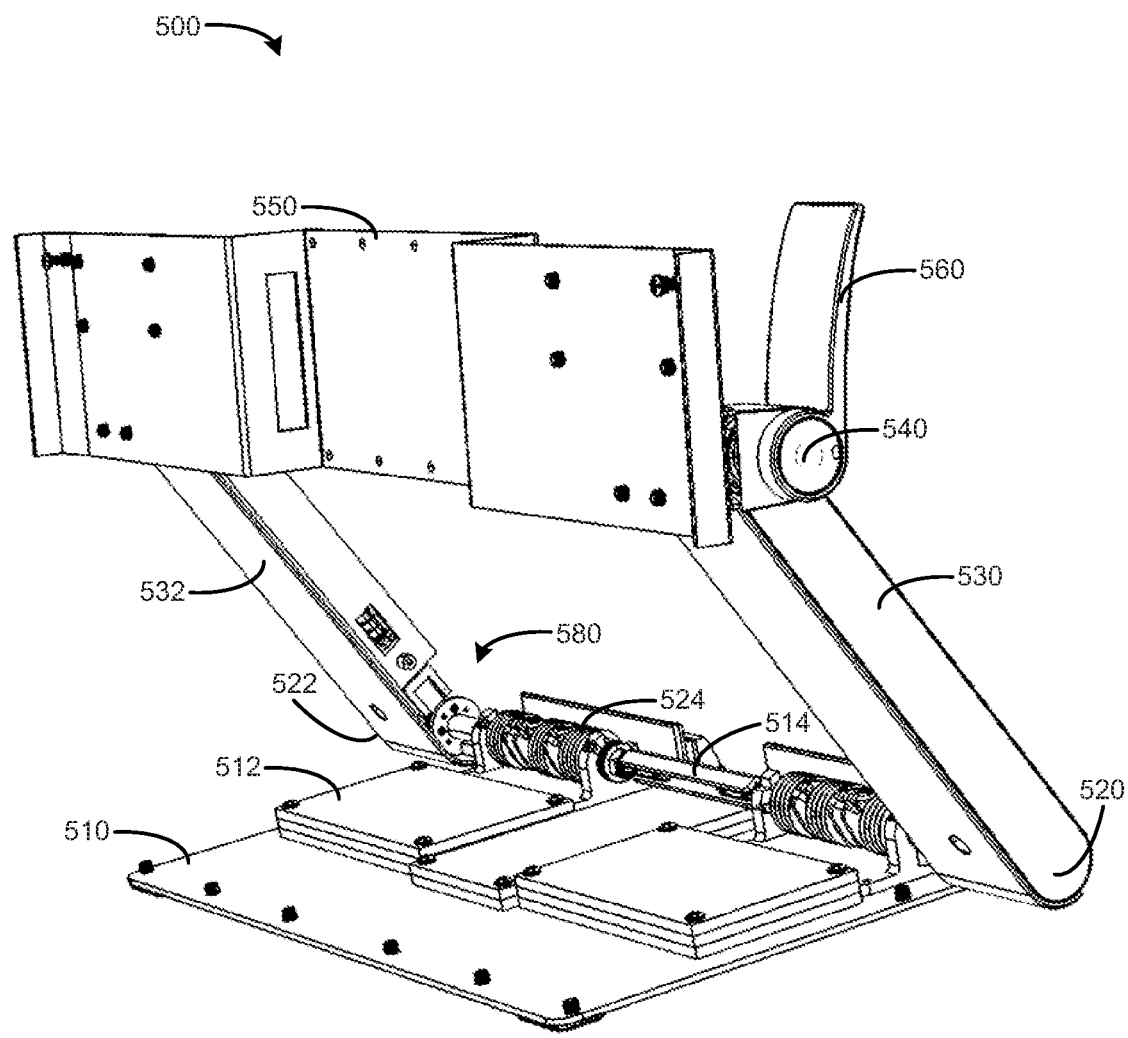
FIG. 5 is a perspective view of an apparatus including an adjuster according to an example.

FIG. 5 is a perspective view of an apparatus 500 including an adjuster 560 according to an example. Apparatus 500 also includes a mount 550, e.g., to receive a display. Base 510 includes weights 512 and springs 524, and is coupled to first and second arms 530, 532 via first and second lower joints 520, 522. The first and second arms 530, 532 are coupled to the mount 550 via upper joint 540 (a second upper joint, corresponding to second arm 532, is not visible in FIG. 5). Adjuster 560 is coupled to the upper joint 540. A drum mechanism 580 is visible coupled to the second lower joint 522. The mount 550 may serve as a structural member that mechanically couples and stabilizes the first arm 530 to the second arm 532. Similarly, a coupling 514 may mechanically couple the first and second arms 530, 532 via the first and second lower joints 520, 522.

The adjuster 560 is illustrated as being mounted on the first arm 530, and and a mechanism 580 is illustrated as being mounted on the second arm 532. However, alternate examples may mix and match adjusters and/or mechanisms on one and/or both arms 530, 532. In an example, one arm includes an adjuster and associated joint mechanisms (clutch, drum brake), and the other arm is a free moving follower arm with no adjuster or mechanisms. A follower arm may provide enhanced stability, e.g., to counteract a twisting motion/racking of the first and second arms 530, 532 that may twist the mount 550. In alternate examples, each arm may include one or more mechanism(s) and/or adjusters, partially serving as a follower/stabilizer arm.

In an alternate example, the first and second arms 530, 532 may be asymmetrically arranged, e.g., one arm may be thicker/wider than the other. A four-bar mechanism may be used in at least one of the first and second arms 530, 532.

The springs 524 are arranged to provide a bias to the first and second lower joints 520, 522. Springs 524 may be biased to counteract a weight of the apparatus that is borne by the first and second arms 530, 532, including the additional a weight of a display or other device to be mounted on mount 550. The apparatus may have brake mechanisms 580 on both first and second arms 530, 532, especially if the apparatus is particularly heavy or safety is a concern to where additional and/or redundant braking effects are desirable.

Figure 6:
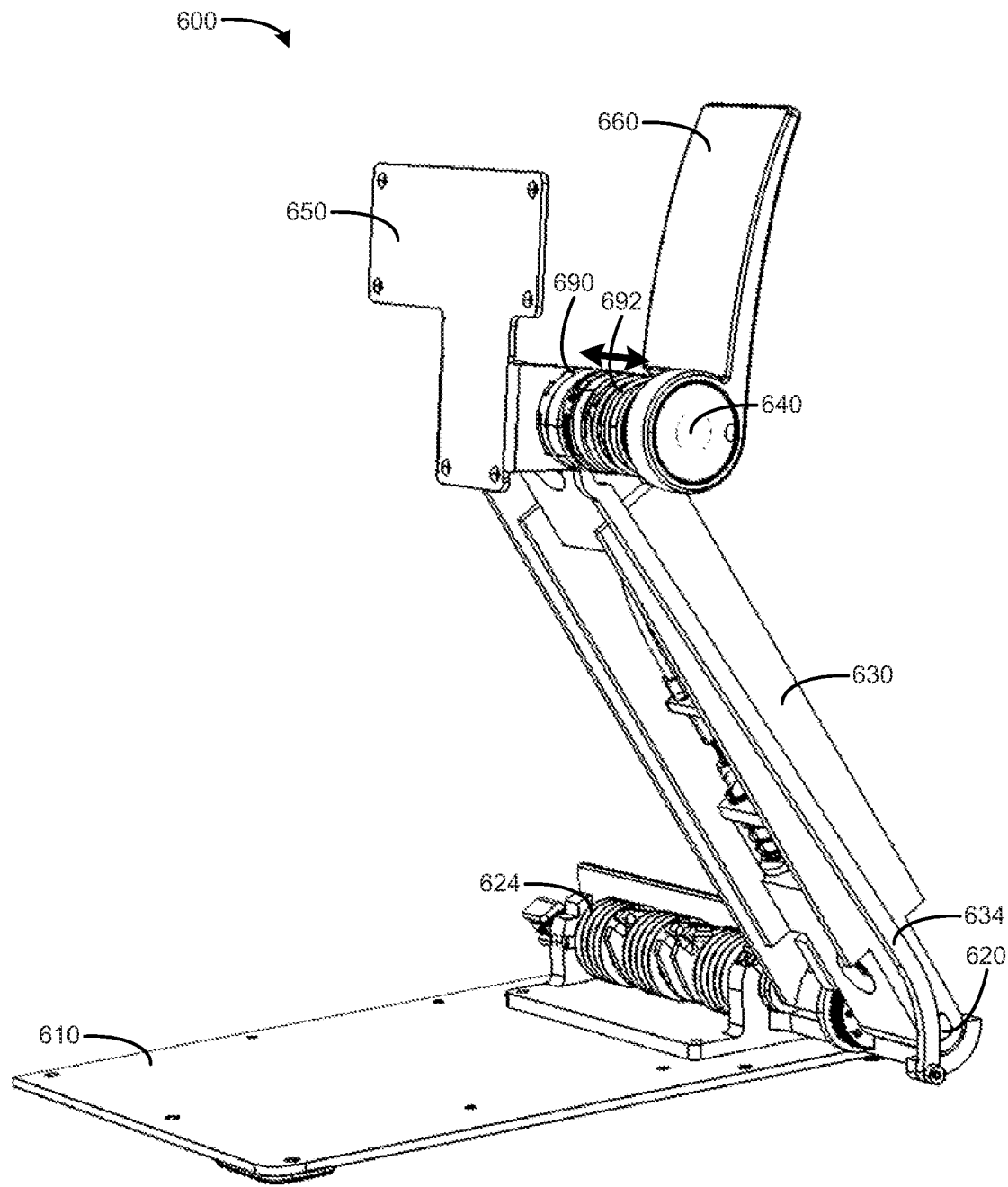
FIG. 6 is a perspective view of an apparatus including an adjuster according to an example.

FIG. 6 is a perspective view of an apparatus 600 including an adjuster 660 according to an example. Apparatus 600 also includes base 610 with associated spring 624, coupled to arm 630. Arm 630 includes a four-bar linkage 634, shown pivotably coupled to a portion of the base 610 and a portion of the mount 650 located at the upper joint 640. The adjuster 660, clutch mechanism 690, and clutch spring 692 are pivotably aligned at the upper joint 640, although in alternate examples the various components do not need to be so aligned.

The clutch mechanism 690 may operate based on a corkscrew principle, e.g., using rotation of the adjuster 660 to laterally move (consistent with the double-headed arrow) a first clutch plate (e.g., fixed relative to the mount 650) along a worm gear to engage/disengage with another clutch plate that is fixed relative to the arm 630. By activating the adjuster 660, the clutch mechanisms can separate (along the double-headed arrow) in a corkscrew motion to free the mount 650 from the arm 630. In alternate examples, other securing mechanisms may be used, including clutches based on a non-worm gear mechanism, and non-clutch mechanisms such as drum gears.

The clutch mechanism 690 is biased against adjustability, based on clutch spring 692 arranged to push the clutch mechanism 690 closed. Thus, the adjuster 660 may be biased toward a default first mode based on the clutch spring 692. In an alternate example, another spring may be used to bias the adjuster 660. Such springs may be coupled to each other, and also may be separate from each other. The clutch spring 692, in conjunction with the characteristics of the clutch mechanism 690 (e.g., clutch teeth), enables the clutch mechanism 690 to operate safely, and enable the clutch mechanism 690 to have a desired yield threshold and generate a desired audio feedback (clicking) when the clutch is forced. The use of independent springs to bias the clutch mechanism 690 and the adjuster 660 also may enable the adjuster 660 to remain biased toward the default/first position/mode, even when a yield threshold of the clutch mechanism 690 (and clutch spring 692) is exceeded. In an example, the clutch mechanism 690 may support a weight of, e.g., forty pounds mounted to the mount 650, based on characteristics of the clutch mechanism 690 including the stiffness of the clutch spring 692. The adjuster 660 may be dimensioned to provide leverage to overcome a stiff clutch spring 692 without needing excessive finger strength to actuate the adjuster 660. The adjuster 660 pull force may be based on the clutch spring 692, or a combination of other spring(s) such as an adjuster spring and/or a lower mechanism spring(s).

The four-bar linkage 634 may enable apparatus 600 to limit some of the rotational ranges of motion of the upper joint 640 and/or lower joint 620. In an alternate example, the four-bar linkage 634 may be omitted. In an example, the four-bar linkage 634 may prevent types of positioning that would result in nonsensical or other undesirable configurations, such as a high angle tilt of the arm 630 away from the user with the mount 650 tilted all the way back such that a display mounted to the mount 650 would be unviewable by, and pointed away from, the intended viewer/user. Thus, configuration of the four-bar linkage 634 may take into account intended usage scenarios of the apparatus. In an example, the four-bar linkage 634 may operate such that when the lower joint is at a high angle, then four-bar linkage 634 limits the upper joint 640 to approximately 90 degrees, and when the lower joint is at a low angle, the four-bar linkage 634 may allow the upper joint 640 to rotate the mount 650 all the way back (e.g., for a table-top configuration of a display).

Figure 7:
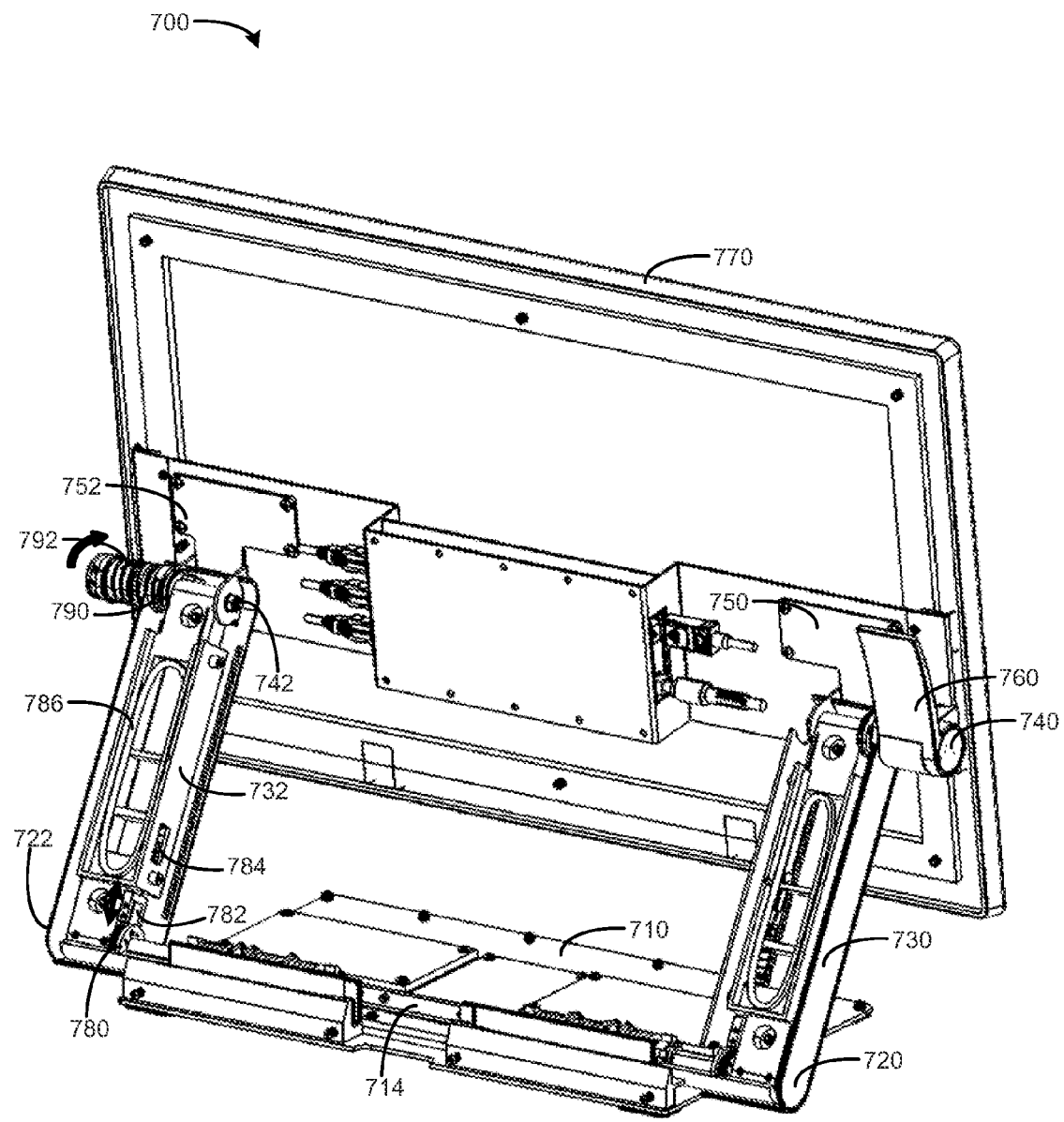
FIG. 7 is a perspective view of an apparatus including an adjuster and display according to an example.

FIG. 7 is a perspective view of an apparatus 700 including an adjuster 760 and display 770 according to an example. The apparatus 700 also includes a base 710 coupled to the display 770 via first and second lower joints 720, 722, first and second arms 730, 732, first and second upper joints 740, 742, and first and second mounts 750, 752. Portions of the apparatus 700 (e.g., a second adjuster and various display/arm/base panels) are not shown for convenience and to reveal underlying components. Apparatus 700 is shown having a symmetric configuration, in that both the first and second arms 730, 732 include adjusters 760 (a second adjuster is not shown to reveal the underlying clutch mechanisms on the second arm 732) and various upper and lower mechanisms associated with both the first and second arms 730, 732. Furthermore, apparatus 700 may include a coupling 714 to help stabilize and coordinate a unified movement of both the first and second arms 730, 732, and resist a spring force to bias the first and second arms 730, 732. The display 770 may serve as a structural member tying together the first and second arms 730, 732. Although shown with two separate mounting points between the display 770 and the arms 730, 732, alternate examples may include a unified mount, e.g., including a standard VESA mount for mounting the display 770.

Apparatus 700 also includes cable(s) 786, to operatively couple the adjuster 760 to a mechanism at the lower joint 720, 722. A drum mechanism 780 is shown, including a plunger 782 and a plunger spring 784 to enable the plunger 782 to slidably engage the drum mechanism 780. The cable 786 may include an outer sheath, and rotation of the adjuster 760 (and corresponding second adjuster, not shown) may wind the cable and pull on the plunger 782 to disengage the drum mechanism 780. Thus, actuating the adjusters 760 enable the simultaneous actuation of the clutch mechanism 790 and drum mechanism 780, to free the first and second upper and lower joints 740, 742, 720, 722 for adjustability. The plunger spring 784 enables separate biasing of the plunger 782, separate from the other springs (e.g., an adjuster spring, a clutch spring, etc.). Furthermore, the release point of the clutch mechanism 790 and the drum mechanism 780 may be independently adjustable, to allow the various mechanisms to release (e.g., enable or disable adjustability) simultaneously or to release/enable at different points along the actuation of the adjusters 760.

In operation, as the adjusters 760 are rotated, the inner cable within the sheath of the cable 786 is drawn upward to apply tension to the plunger spring 784, by virtue of the inner cable moving relative to the cable sheath. The cable 786 may accommodate variances in a service distance between the adjuster 760 and lower and upper joints 720, 740, throughout a range of motion of apparatus 700. Thus, a change in distance between where the cable 786 is pulled on one end, and where the cable is pulling on the other end, does not affect the pull characteristics on the plunger 782, resulting in consistent/precise and accurate actuation of the lower mechanism. Thus, use of cable 786 avoids a need for complex gearing and/or linkage, and enables a high degree of tolerance to individually control the actuation points of the clutch mechanism 790 and the drum mechanism 780. The cable 786 enables control over these features, even in view of changing distances between the two pivot centers of the upper and lower joints 742, 722, regardless of the location of the adjuster 760.

The cable 786 is shown with a service loop, such that the cable 786 is longer than the distance between the lower and upper joints 742, 722. The length of cable 786 may reduce an amount of friction experienced inside the cable's sheath, based on the loop having a gentler curvature/arc to reduce forces between the sheath and the underlying cable. The service loop is to be sufficient to reduce friction and/or to accommodate the varying distance between the cable ends (e.g., the sheath itself moving relative to the arm 732 throughout a range of motion of the apparatus 700). The illustrated example shows one service loop being used, although less than one loop or more than one loop may be used.

In an alternate example, the apparatus 700 may use at least one, or a system of, solenoids to provide locking and releasing motions of the various engagement/locking mechanisms. A solenoid may be powered based on receiving external power, e.g., based on a dedicated display power cord. In alternate examples, the solenoids may be powered based on receiving power provided to the display 770, or based on a USB cord plugged into the display 770 and routed directly to the solenoids, for example. One or more solenoids may be provided on each joint, and may be actuated based on an electronic switch/button and/or based on a software interface displayed on the display 770 and/or interacted with based on service buttons located on the display (similar to brightness/contrast and other controls).

The illustrated example of FIG. 7 shows mechanical mechanisms based on teeth, e.g., a gear. The gear mechanism enables the choice of a yield threshold and generating audio feedback. Gears may include faced gears, lined gears, and so on. In alternate examples, the mechanisms may be based on a rubber-on-rubber system (e.g., smooth interaction surfaces without discrete teeth), a one-way roller clutch and stopper with rubber a pawl system, a cleat system (e.g., knuckles with teeth, cams etc.), or other actuatable mechanisms.

Figure 8:
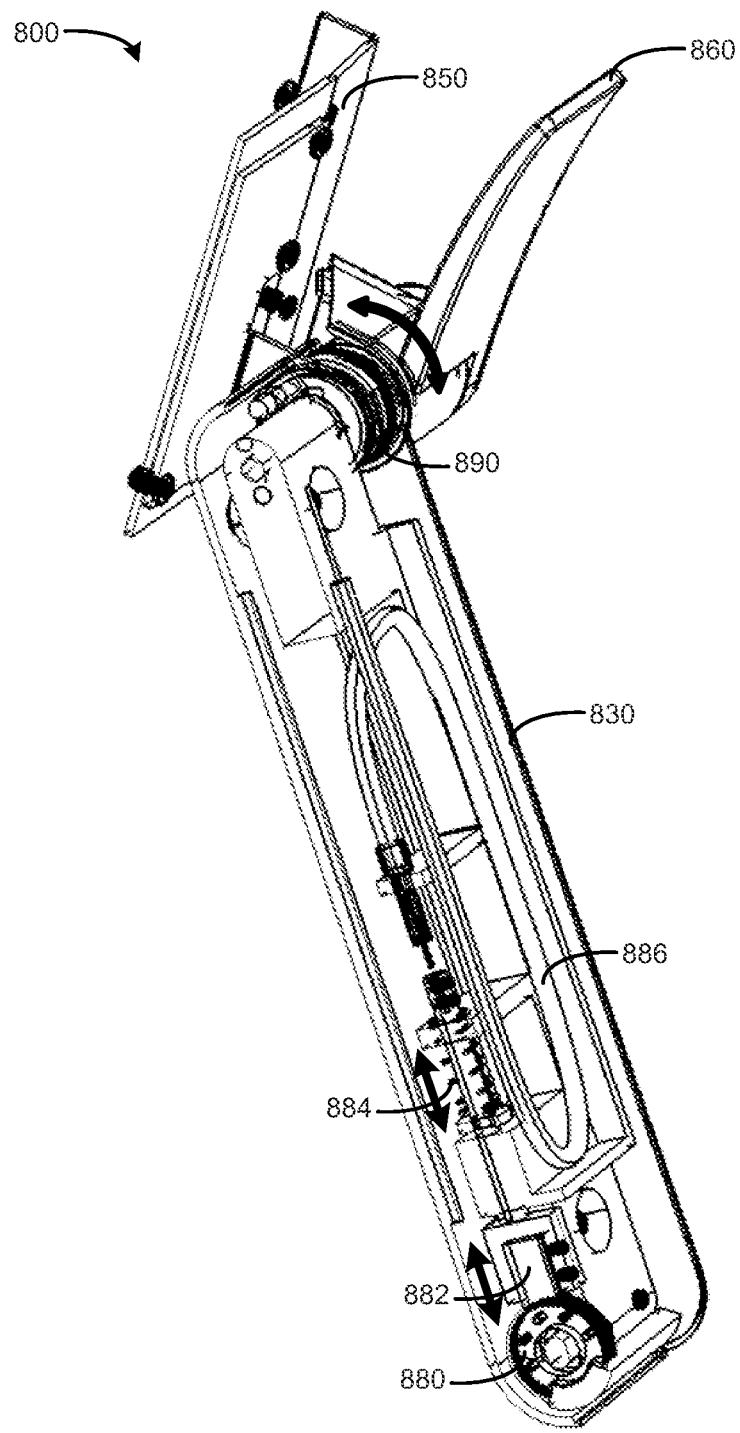
FIG. 8 is a perspective cut-away view of an apparatus including an adjuster according to an example.

FIG. 8 is a perspective cut-away view of an apparatus 800 including an adjuster 860 according to an example. The visible portion of apparatus 800 also includes a portion of mount 850 coupled to arm 830. Arm 830 illustrates various components in greater detail due to the partial cut-away view, including clutch mechanism 890, cable 886, plunger spring 884, plunger 882, and drum mechanism 880.

Adjuster 860 may be biased toward the position shown, locking the clutch mechanism 890 and the drum mechanism 880. Such bias may be due to a dedicated adjuster spring, and/or due to the springs local to the mechanisms themselves. In use, the adjuster 860 may be pulled toward the mount 850, to disengage the clutch mechanism 890 and the drum mechanism 880. The rotational motion of adjuster 860 may cause the clutch mechanism 890 to separate, based on separation of clutch plates along the axis of rotation of the adjuster 860. The rotational motion further winds a portion of the cable 886 (e.g., about the axis of the upper joint), pulling the cable within its sheath to cause the plunger spring 884 to compress and the plunger 882 to move upwards, away from the drum mechanism, thereby freeing the arm to rotate about the drum mechanism 880.

FIG. 9A is a perspective cut-away view of an apparatus 900A including a mechanism 990A according to an example. Apparatus 900A also includes an adjuster 960A, a clutch spring 992A, and arm 930A. The clutch mechanism 990A includes a clutch plate that is slidable along its axis of rotation, but may be kept from rotating independent of the arm 930A. For example, the axis of the clutch plate may be keyed to prevent rotation of the clutch plate about that axis. The axis of the clutch plate may be coupled to rotate with the mount and/or arm. For example, the clutch plate of clutch mechanism 990A is rotatably fixed relative to arm 930A, such that the clutch plate rotates with the arm 930A, while being slidable along the axis. The clutch plate may be pulled toward the clutch spring 992A, compressing the clutch spring 992A as the adjuster 960A is rotated from a first mode/position to a second mode/position. This allows the clutch plate of clutch mechanism 990A to disengage from a corresponding clutch plate (not shown in FIG. 9A, see FIG. 9B) that is rotatably fixed to a mount. In alternate examples, the positions and/or functions of the clutch plates 990A, 990B may be reversed.

FIG. 9B is a perspective cut-away view of an apparatus 900B including a mechanism 990B according to an example. The apparatus 900B also includes a mount 950B coupled to arm 930B via clutch mechanism 990B. The clutch mechanism 990B may include a clutch plate that is rotatably fixed to the mount 950B, such that when the mount 950B pivots about its joint, the clutch plate similarly pivots, by virtue of a keyed axle. Accordingly, the clutch plate of FIG. 9B is to engage with the clutch plate 990A of FIG. 9A, and may be selectively prevented from rotating by being engaged or disengaged by the corresponding clutch plate in FIG. 9A. The teeth of the clutch mechanism 990A, 990B are visible, illustrating how they may act upon each other to enable a yield threshold (in conjunction with the strength of the clutch spring 992A) and generate an audio feedback when the yield threshold is exceeded. Furthermore, the clutch enables the yield threshold to be exceeded without incurring damage.

FIG. 9C is a perspective cut-away view of an apparatus 900C including a mechanism 980C according to an example. The drum mechanism 980C is rotatably fixed to a base, such that the arm 930C is to rotate about the stationary drum mechanism 980C that is fixed to the base (not shown). The plunger 982C is slidably fixed to the arm 930C, to rotate with the arm as the arm pivots about the drum mechanism 980C (the arm 930C pivotable relative to the base). The cable 986C is to pull on the plunger 982C, compressing the plunger spring 984C and disengaging the plunger 982C from the drum mechanism 980C. When disengaged, the plunger 982C, and therefore the arm 930C, are freed to rotate about the drum mechanism 980C. When engaged, the teeth of the plunger 982C engage the teeth of the drum mechanism 980C, preventing the arm 930C from rotating about the drum mechanism 980C. Similar to the clutch teeth, the drum and plunger teeth enable a yield threshold and associated audio feedback (without resulting in damage upon exceeding the yield threshold). The plunger/drum threshold and audio feedback are separate and distinct from the threshold and audio feedback of the clutch mechanism. Therefore, examples may enable a first threshold for the lower joint (e.g., the drum mechanism 980C), and a second threshold for the upper joint (e.g., the clutch mechanism 990).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein and as disclosed in the following claims.

What is claimed is:

1. An apparatus comprising:
   a base;
   a lower joint to couple the base to an arm;
   an upper joint to couple the arm to a mount;
   an adjuster to control operation of the lower joint and the upper joint according to a first mode and a second mode, wherein the first mode is to secure the lower and upper joints against adjustability, and the second mode is to release the lower and upper joints for adjustability; and
   a brake mechanism to secure and release at least one of the lower and upper joints in response to the adjuster, wherein the brake mechanism includes a locking gear secured to the base at an axis of rotation of the lower joint, and a plunger is slidably secured to the arm and pivotable with the arm about the locking gear, wherein the plunger is slidable to engage or disengage the locking gear based on a cable actuatable by the adjuster remotely from the brake mechanism, to secure or release the arm relative to the base.

2. The apparatus of claim 1, further comprising:
   at least one additional arm to couple the base to the mount via at least one corresponding set of additional lower and upper joints; and
   an additional adjuster to control operation of the at least one additional lower and upper joints according to the first mode and the second mode.

3. The apparatus of claim 2, Wherein the apparatus is to enable adjustability when both the adjuster and the additional adjuster are actuated, and disable adjustability when both are not actuated.

4. The apparatus of claim , wherein the lower and upper joints, when secured according to the first mode, are associated with a yield, threshold to enable a yield adjustability when the yield threshold is exceeded.

5. The apparatus of claim 4, wherein at least one of the lower and upper joints is associated with providing audio feedback associated with exceeding: the yield threshold.

6. The apparatus of claim 1, wherein the adjuster comprises a lever to pivot about an axis of rotation associated with the upper joint, wherein the lever is to extend from the axis of rotation to provide an actuation portion of the lever proximate and substantially parallel to the mount.

7. The apparatus of claim 1, further comprising a dutch mechanism to secure and release at least one of the lower and upper joints in response to the adjuster.

8. The apparatus of claim 1, wherein a plunger actuation range of motion is to correspond to an adjuster actuation range of motion, independent of variations in a service length between the adjuster and the brake mechanism throughout a range of motion of the lower and upper joints.

9. The apparatus of claim 1, wherein the cable is enclosed by a sheath, and the cable and sheath have an extended length that is to exceed a service length between the brake mechanism and the adjuster, to accommodate relative changes in the service length throughout the range of motion of the lower and upper joints.

10. An apparatus comprising:
    a base;
    a first arm to couple the base to a first mount via a first lower joint and a first upper joint;
    a second arm to couple the base to a second mount via a second lower joint and a second upper joint. wherein the first and second mounts are to receive a display;

a first adjuster associated with the first arm to control operation of the first upper and lower joints according to a first mode and a second mode, wherein the first mode is to secure the first upper and lower joints against adjustability, and the second mode is to release the first upper and lower joints for adjustability; and a second adjuster associated with the second arm to control operation of the second upper and lower joints, according to the first and second modes as applied to the second upper and lower joints, wherein the first and second adjusters are positioned proximate to edges of the display such that an edge of the display and a corresponding one of the first and second adjusters are grippable together to actuate the first and second adjusters to position the display.

11. An apparatus comprising:

a base;

a first arm to couple the base. to a display via a first lower joint and a first upper joint;

a second arm to couple the base to the display via a second lower joint, and a second upper joint;

a first adjuster associated with the first arm to control operation of the first upper and lower joints according to a first mode and a second mode, wherein the first mode is to secure the first upper and lower joints against adjustability, and the second mode is to release the first upper and lower joints for adjustability; and a second adjuster associated with the second arm to control operation of the second upper and lower joints, according to the first and second modes as applied to the second upper and lower joints, wherein the first and second adjusters are positioned proximate to edges of the display such that an edge of the display and a corresponding one of the first and second adjusters are grippable together to actuate the first and second adjusters to position the display.

12. The apparatus of claim 11, wherein the first and second upper and lower joints are adjustable to position the display within a range of motion including a lower flat position and an upper vertical position.

\* \* \* \* \*

UNITED STATES PATENT AND TRADEMARK OFFICE
CERTIFICATE OF CORRECTION

PATENT NO. : 9,255,661 B2
APPLICATION NO. : 13/907788
DATED : February 9, 2016
INVENTOR(S) : David Quijano et al.

It is certified that error appears in the above-identified patent and that said Letters Patent is hereby corrected as shown below:

In the Claims

In column 12, line 21, in Claim 1, delete "plunger is slidably" and insert -- plunger slidably --, therefor.

In column 12, line 33, in Claim 3, delete "claim 2, Wherein" and insert -- claim 2, wherein --, therefor.

In column 12, line 37 approx., in Claim 4, delete "claim ," and insert -- claim 1, --, therefor.

In column 12, line 39 approx., in Claim 4, delete "yield, threshold" and insert -- yield threshold --, therefor.

In column 12, line 48, in Claim 7, delete "dutch" and insert -- clutch --, therefor.

In column 12, line 66, in Claim 10, delete "joint." and insert -- joint, --, therefor.

In column 13, line 17, in Claim 11, delete "base." and insert -- base --, therefor.

In column 13, line 20, in Claim 11, delete "joint, and" and insert -- joint and --, therefor.

Signed and Sealed this
Twenty-sixth Day of July, 2016

Michelle K. Lee
*Director of the United States Patent and Trademark Office*